(No Model.)
D. T. SHARPLES.
MILK TESTING APPARATUS.
No. 458,193. Patented Aug. 25, 1891.
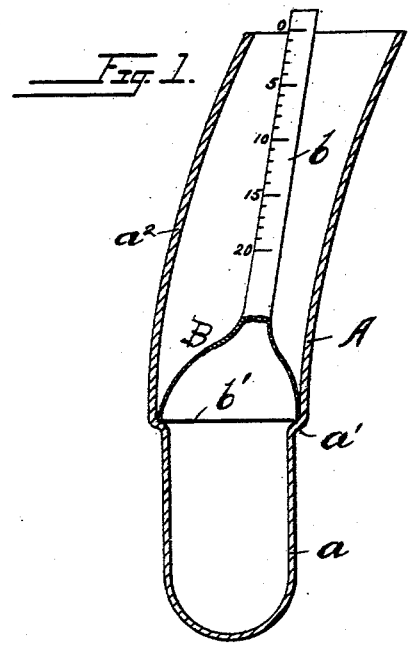
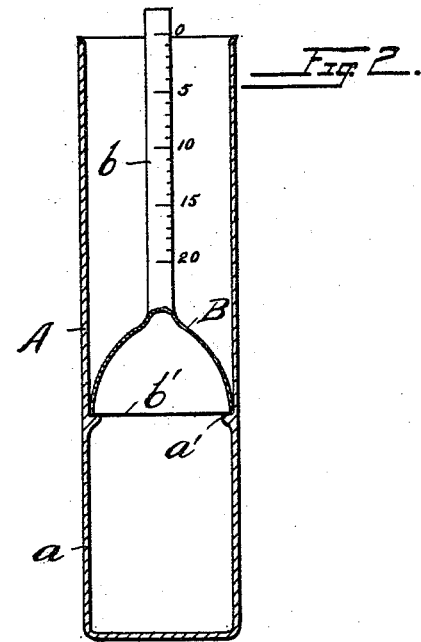
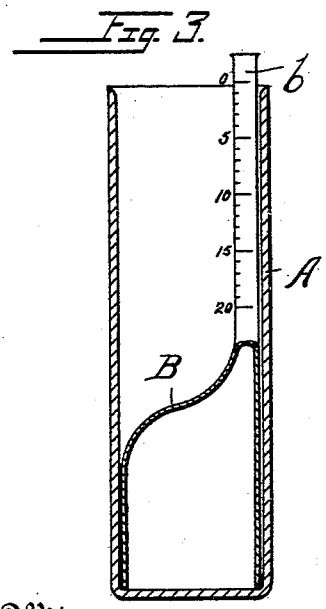
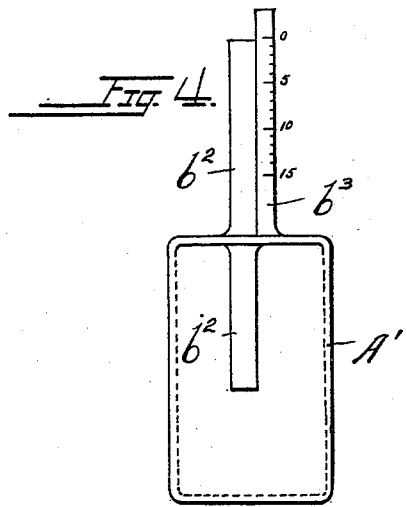
Witnesses
David T. Sharples, Inventor
By his Attorney

UNITED STATES PATENT OFFICE.

DAVID TOWNSEND SHARPLES, OF ELGIN, ILLINOIS.

MILK-TESTING APPARATUS.

SPECIFICATION forming part of Letters Patent No. 458,193, dated August 25, 1891.

Application filed February 4, 1891. Serial No. 380,244. (No model.)

*To all whom it may concern:*

Be it known that I, DAVID TOWNSEND SHARPLES, a citizen of the United States, residing at Elgin, in the county of Kane, State of Illinois, have invented certain Improvements in Milk-Testing Apparatus, of which the following is a specification.

This invention relates to improvements in apparatus adapted more especially for determining the proportionate amount of butter fat in milk. In testing milk for this purpose it is customary to mix with a certain quantity of the milk a solvent for the casein—sulphuric acid, for instance—and thereafter to allow the fatty part to separate and to cause it to rise into a measuring-tube by adding hot water. Generally the separation is hastened and perfected by subjecting the compound to centrifugal action.

The object of my present invention is to provide improved vessels wherein to carry out such tests either by gravity alone or with the aid of a centrifugal apparatus. It is fully described hereinafter in connection with the accompanying drawings, and is specifically pointed out in the claims.

Figure 1 is an elevation, partly in section, of an apparatus which embodies all the features of my invention. Figs. 2, 3, and 4 illustrate modified constructions involving one or more of said features.

Referring to Fig. 1, A is a glass vessel of circular section, but having a curved center line, thus forming a convex wall $a^2$. It has a cylindrical extension $a$ closed at the bottom and of smaller diameter than the upper or main vessel A, the junction with which forms an annular shoulder $a'$. B is an irregularly-shaped glass tube resembling a bottomless bottle. The body portion is adapted to loosely fit within the vessel A, and the thin elongated neck $b$ is represented as both out of center and out of angle with the base edge $b'$ of the tube, which is adapted to rest upon the shoulder $a'$. The effect of this construction will be hereinafter described. The neck $b$ is graduated, as usual, to measure the height of the butter-fat column. Unlike apparatus heretofore in use, however, the top mark of the graduation is the zero or starting mark, and the highest numbered mark on the scale is nearest the body of the tube. Moreover, this zero-mark on the scale is at such a height with reference to the open top of the vessel A, which serves as a supply-opening when the base $b'$ is seated on the shoulder $a'$ that the top of the fat column will be at the zero-mark when the vessel A is filled during the process of testing. The advantage of this construction will be explained in describing the operation of the apparatus, which may be as follows:

A certain quantity of each quality of milk to be tested is measured into the extensions $a$ of the vessels and a proportion of sulphuric acid is added to each and well mixed. The chemical action resulting dissolves the casein and develops considerable heat. If the separation is to be effected by gravity alone, the solution should be left standing for several hours. This will only be done where few samples are to be tested, as the separation is slow and incomplete. In such cases, however, it is only necessary with my apparatus to employ one of the graduated tubes B in connection with a number of vessels, it being applied to each one in succession. The body part of the tube is pushed down into the vessel A until its base is seated upon the shoulder $a'$. The fat is then raised into the graduated neck $b$ of the tube by pouring hot water into the vessel, which circulates around the tube-body and under its base $b'$, which does not form a close joint on its seat into the lower extension $a$, where it sinks to the bottom, thus raising the mixture up into the tube B. No care is required in pouring in the water, as it is impossible to flush the fat over the neck $b$, which extends above the open top of the vessel A. The water may be allowed to overflow the vessel, but can only raise the top of the fat column to the zero-mark of the graduated neck. The reading of the scale at the lower end of the column will at once give its height. In taking this reading it will be found advantageous to look through the convex wall at $a^2$, as the effect will be to magnify both the diameter of the tube and the spacing of the graduations, thus making an accurate reading easy. The operation is substantially the same if, instead of allowing the fatty particles to rise by gravity alone, centrifugal action is employed to effect a more rapid and perfect separation.

Various modifications of the construction above described may evidently be devised, which will involve one or more of the novel features of my invention. In Fig. 2, for instance, the vessel A and its extension $a$ form a cylinder of uniform diameter, the annular interior shoulder $a'$ serving as a seat for the tube B. The neck $b$ of the latter is perfectly central and at right angles with the base $b'$, and, if examined through the glass wall, is magnified in diameter, but not to as great an extent as in Fig. 1, and the spacing of the graduations is not magnified at all.

In Fig. 3 there is no extension $a$ or shoulder $a'$, but the base of the tube B rests directly upon the bottom of the vessel. In this case the body of the tube is cylindrical for some distance, and when pushed down into the vessel after the milk and acid have been mixed therein it incloses practically the whole mixture. The graduated neck $b$ is considerably out of center and close to one side of the vessel, and may be read either through the near or far wall of the vessel, if of glass, being in the latter case greatly magnified in diameter, while in the former any turgidity or cloudiness of the liquid in A will not interfere with the reading.

In Fig. 4 only one feature of my invention is involved, the construction otherwise being substantially different. The vessel A' is formed with an integral inlet or supply tube $b^2$, extending down into the body of the vessel some distance and also above its closed top to a somewhat less height than the graduated tube $b^3$, which opens into the top of the vessel and the zero graduation of which corresponds with the open top of the supply-tube $b^2$. The milk and acid are both supplied through this tube, and after the separation of the fat is completed it is raised into the graduated tube to the zero-mark by supplying hot water until it overflows at the top of the tube $b^2$, the height of the column being then read off directly, as in the other constructions described.

Instead of making the vessel A of glass, sheet metal may be used, thus avoiding all danger of its breakage. In this case, of course, the advantage of magnifying the tube cannot be secured; but the avoidance of breakage may be considered as overbalancing the loss of this advantage. To read the height of the column of fat, it is only necessary in this case to place a finger on the open end of the graduated tube and then raise the tube sufficiently to bring the bottom of the column above the top edge of the opaque vessel.

The advantages of my improved apparatus will be readily appreciated. The utensils are both easily and cheaply made. One graduated tube may be used in connection with a number of main vessels. The fat column is always sure to start at the zero-mark, from which its height can be read at a glance, instead of falling midway of the scale and requiring careful calculation to secure a correct reading, as has been heretofore the case. The magnifying of the scale is a considerable advantage, as is also the ease with which the utensils may be handled and thoroughly cleansed.

What I claim is—

1. In a milk-testing apparatus, the combination, with a cylindrical vessel having a closed bottom, of the open glass tube B, having upper portion $b$ of small diameter and an enlarged lower end loosely fitting the vessel and seated therein, so as to permit a limited flow of liquid around the enlarged end and under its base, substantially as and for the purpose set forth.

2. In a milk-testing apparatus, the combination of a vessel having a closed bottom and a bottle-shaped tube having a body fitting loosely within said vessel and an upwardly-extending neck for the butter fat located out of center with said body and with the vessel, substantially as set forth.

3. In a milk-testing apparatus, a testing-vessel having a supply-opening and a graduated neck separated from and extending beyond said opening, the zero-mark of the graduation upon said neck being arranged to correspond with the level of said opening and the graduations extending downward therefrom, substantially as set forth.

4. In a milk-testing apparatus, the combination, with a cylindrical vessel having a closed bottom and an open top, of an open tube having its lower end enlarged to loosely fit the vessel and its base seated therein, so as to permit a limited flow of liquid around the enlarged end and under its base, the reduced portion or neck of said tube extending above the open top and being graduated so that the zero-mark corresponds with the supply-opening of the vessel when the tube is seated therein, substantially as set forth.

5. In a milk-testing apparatus, the combination, with the measuring-tube B, having an enlarged substantially hemispherical lower end, of the curved cylindrical vessel loosely inclosing the measuring-tube, whereby said tube is magnified, as described, and is readily withdrawn from the vessel, substantially as set forth.

6. In a milk-testing apparatus, the combination, with a vessel having a closed bottom and formed with an interior annular shoulder, of a bottle-shaped tube having a body fitting loosely within the vessel above said shoulder and its base seated thereon, said tube being formed with an upwardly-extended neck for the butter fat, substantially as set forth.

7. In a milk-testing apparatus, the combination of a graduated measuring-tube and a curved cylindrical vessel of uniform circular section inclosing the same, substantially as described, whereby the size and spacing of the graduations are magnified, for the purpose set forth.

In testimony whereof I affix my signature in presence of two witnesses.

DAVID TOWNSEND SHARPLES.

Witnesses:
  JOS. H. FRENCH,
  HUGH L. GIVEN.